United States Patent Office 2,995,510
Patented Aug. 8, 1961

2,995,510
PURIFICATION OF ALUMINA
Ralph J. Bertolacini, Chesterton, and Herman S. Seelig, Valparaiso, Ind., assignors to Standard Oil Company, Chicago, Ill., a corporation of Indiana
No Drawing. Filed July 10, 1958, Ser. No. 747,591
17 Claims. (Cl. 208—139)

This invention relates to alumina and, more specifically, to a method of purifying gamma-type aluminas containing trace amounts of impurities by slurrying the alumina with an ion exchange resin whereby the properties of the alumina as a catalyst and/or catalyst support are substantially enhanced.

Platinum-on-alumina catalysts are used extensively in present day reforming operations to upgrade hydrocarbon naphthas in such processes as exemplified by Ultraforming (Petroleum Engineer—Vol. XXVI, No. 4, April 1954—page C–35). Originally, the substantial catalyst cost of such processes was associated with the platinum content of the catalyst. With modern platinum-recovery techniques, however, substantially all of the platinum can be recovered at small cost and reused in the preparation of new platinum-on-alumina catalysts. Thus, the principal factor in making up catalyst cost is the alumina base.

The relatively-high cost of the alumina base results from the stringent specifications with respect to contaminant content, e.g., less than 0.05 percent by weight. As a result, low-cost, commercial-grade aluminas could not heretofore be employed for such purposes. It is therefore an object of the present invention to provide a method for purifying such low-cost, commercial-grade aluminas whereby impurities, particularly sulfur and trace metal contaminants, e.g., sodium, calcium, and the like, are substantially reduced. Another object of the present invention is to provide a method of preparing platinum-alumina catalysts of improved activity from inexpensive commercial-grade aluminas. These and other objects of the present invention will be apparent from the following detailed description thereof.

It has now been discovered that the contaminant level of commercial-grade aluminas can be substantially reduced at minimum cost by contacting the alumina with ion exchange resin capable of removing the contaminants. Thus, in accordance with the present invention, the alumina to be purified is slurried in an aqueous medium, e.g., water, containing an ion exchange resin, usually a mixture of about equal weights of both anionic and cationic exchange resins, for a period in excess of about 0.1 minute. The alumina and ion exchange resin must be in finely divided form to assure adequate contacting. They must also differ in particle size and/or density from each other sufficiently to permit subsequent separation by particle-size and/or density classification. The alumina is thus separated from the resin by the simple techniques of particle-size classification, e.g., screening, and/or density classification, e.g., elutriation, or a combination of both techniques. The resulting alumina of reduced contaminant content may then be employed as a catalyst per se and/or as a catalyst support. After being employed for purification, the resin may be regenerated for further use by techniques known in the art, as hereinafter described.

The present purification technique is applicable to both high-purity aluminas, e.g., less than 0.05 percent contaminants, and commercially-pure aluminas, which may contain as much as 0.5 percent of a single contaminant and/or as much as 1 percent or more of total contaminants. The primary benefit from and incentive for practicing the present technique lies, of course, in the treatment of the commercially-pure aluminas. The present invention may also be advantageously employed in the purification of platinum-alumina composites which have become contaminated with impurities (e.g., sulfur, sodium, calcium, and the like), during use, e.g., in the reforming of petroleum naphthas. Both the high-purity and commercially-pure aluminas, which may be treated in accordance with the present invention, are gamma-type aluminas, i.e., gamma, eta, chi, theta, and/or kappa aluminas (see "Alumina Properties"—Technical Paper No. 10, revised by A. S. Russell et al., copyright 1956—Aluminum Company of America).

Ion exchange resins employed in the practice of the present invention are high-molecular polymers containing ionic grouping as integral parts of the polymer structure. The anionic exchange resins are polymers containing amine groups as integral parts of the polymer lattice and an equivalent amount of anions such as chlorides, hydroxyl, etc., ions. These resins are effective for removal of deleterious anions, such as sulfate. The cation exchange resins are polymers containing phenolic, sulfonic, carboxylic, phosphonic acid groups as an integral portion of the resin and an equivalent amount of cations. These resins are effective for removal of deleterious metals, such as sodium and calcium. The polymeric portion of the resin is usually so-highly crosslinked that the solubility of the resin structure is negligible. Many satisfactory anionic, cationic, and mixed ion exchange resins are readily-available on the commercial market. Examples of commercially-available anionic exchange resins include "Dowel 1" (Dow Chemical Company) and "Amberlite IR 4B" (Rohm & Haas Company); examples of cationic exchange resins include "Dowex 50" and "Amberlite IR 120"; an example of a mixed resin is "Amberlite MB-3." The resins per se do not, of course, constitute a part of the present invention and need not be described in detail. Complete details are already available in the literature. When a mixed resin is used, the relative proportions of anionic and cationic exchange resins may be adjusted or "tailored" to fit the corresponding types of impurities in the particular alumina being purified.

To assure contacting of at least a substantial portion of the alumina being treated with the ion exchange resin, both should be in finely-divided form, i.e., both should be small enough to pass a No. 10 standard sieve. (By "standard sieve" is meant the A.S.T.M. Standard Specification for Sieves for Testing Purposes—A.S.T.M. Designation E11–39, Fine Series of Woven Wire Cloth Sieves.) If necessary, this may be accomplished by ordinary techniques of crushing, grinding, and the like. In addition to being in finely-divided form, the alumina and resin should also differ in particle size and/or density from each other sufficiently to permit separation by particle-size classification, e.g., by screening, and/or by density classification, e.g., elutriation. In practice, it has been found that a particle size difference of at least about two consecutive standard sieves gives very satisfactory separation. Standard sieves, as above defined, are numbered consecutively from the No. 10 sieve in increasing fineness as follows: Nos. 10, 12, 14, 16, 18, 20, 25, 30, 35, 40, 45, 50, 60, 70, 80, 100, 120, 140, 170, 200, 230, 325, and 400. For density classification, densities of the alumina and resin should differ by at least 10 percent, and, preferably, by at least 25 percent.

The preferred embodiment, and operative embodiment when essentially 100 percent separation is required, e.g., when preparing a platinum-alumina catalyst, is separation by particle-size classification. Particle size of the resin may be either larger or smaller than the particle size of the alumina, preferably larger. When slurrying the alumina in the aqueous medium containing the ion exchange resin, no significant attrition of either the resin or alumina particles has been noted. If either the alumina or resin should be prone to attrition, however, that material should have the smaller particle size; and, attrition would not interfere with separation by particle-size classification. When classifying the particles by screening, rapid separation may be effected by maintaining a slight partial pressure on the screen, e.g., a partial pressure equivalent to about 2 to 20 inches of water.

The slurrying medium for the alumina and ion exchange resin is normally an aqueous medium. Substantially pure water is usually employed, the pH of which may be raised somewhat or lowered somewhat depending upon the type of ion exchange resin employed. The anionic exchange resins function best in neutral or basic media and have a tendency to raise the pH of the media, e.g., to about 7.5 to 8.0. Similarly, cationic exchange resins are more efficient in neutral or slightly acidic media and have a tendency to lower the pH, e.g., to about 6.0 to 6.5. When a mixture of both cationic and anionic exchange resins are employed, a substantially neutral aqueous solution is usually preferred.

The amount of aqueous medium is not critical although it should be sufficient to permit ready slurrying of the alumina and ion exchange resin. Normally, an amount in excess of this minimum is employed, e.g., the weight of water may be from 2 to 20 times the total weight of the alumina and resin. Temperature and pressure are also not critical variables. Thus, temperature and pressure may be above or below ambient temperature and atmospheric pressure respectively, although we prefer to use ambient temperature and essentially atmospheric pressure. Temperatures should, of course, be below both the boiling point of the aqueous medium at the particular pressure being employed and the temperature at which the resin loses its ion exchange properties, the temperature depending upon the particular resin or resins being employed.

Slurrying of the alumina and ion exchange resin should be continued for at least about 0.1 hour, e.g., about 0.2 to 20 hours, and preferably about 0.5 to 5 hours. The weight ratio of alumina being treated to ion exchange resin should preferably be less than about 20:1, and optionally below about 10:1, e.g., 4:1.

The alumina purified in accordance with the present invention can be prepared in any of the usual catalytic forms. For example, it can be ground to a powder for use in fluidized form. It can be broken into irregular fragments. It can be prepared in various shapes, such as pills, pellets, rings, rosettes, saddles, and the like, as desired. It is suitable per se as a catalyst for various processes, such as the dehydration of alcohols, the reaction of methanol and ammonia to produce methylamines, the vapor-phase finishing of synthetic gasolines, and the like. As previously noted, the alumina is also a highly-satisfactory support for one or more other catalytic materials, such as, molybdena, chromia, platinum, nickel, palladium, cobalt, silica, ruthenium, halogens, rhodium, and the like. The addition of such other catalytic substances is conveniently carried out before or after drying, or before or after drying and calcining, the alumina which has been separated from the ion exchange resin.

If another catalytic substance, e.g., platinum, is incorporated, it is usually incorporated after drying and calcining the purified alumina, which may also be ground, lubricated (e.g., with Sterotex, a hydrogenated coconut oil), and pelleted. Platinum may be introduced by impregnation with an aqueous solution containing a platinum compound. When employing the purified alumina in the present invention to prepare a platinum hydroforming or isomerization catalyst, about 0.01 to 1.0 percent by weight of platinum and about 0.01 to 5 percent by weight of halogen, usually chlorine or fluorine, are usually incorporated. The platinum and halogen may be incorporated separately, or together; and when incorporated together, it is conveniently done so by employing a halogen-containing platinum compound, e.g., chloroplatinic acid, platinum tetrachloride, platinous chloride, platinic fluoride, and the like. A particularly active catalyst may be produced by impregnating the purified and calcined alumina with an aqueous solution of a platinum compound in the presence of between about 0.01 to 0.02 mole of a water-soluble inorganic aluminum salt per mole of $Al_2O_3$, e.g., an aqueous solution of chloroplatinic acid containing aluminum chloride.

In a specific and preferred embodiment of the present invention, a commercial-grade alumina containing trace amounts of contaminants is ground to pass a No. 200 standard sieve and the crushed alumina is slurried in water, for about 0.5 to 1.0 hour, containing a mixture of about equal weights of anionic and cationic exchange resins having particle sizes small enough to pass a No. 10 standard sieve but too large to pass a No. 200 standard sieve. The weight ratio of water to alumina to resins is about 30:4:1. After slurrying, the alumina is separated from the resins by screening with a No. 200 standard sieve. The separated alumina is dried, e.g., at 200 to 600° F. for 1 to 24 hours, and calcined, e.g., at 600 to 1200° F. for about 1 to 24 hours, crushed to pass at least a No. 30 standard sieve, lubricated (e.g., with Sterotex), pelleted (e.g., ⅛″ x ⅛″ cylindrical pellets), and again calcined. The resulting purified alumina pellets are then impregnated with an aqueous solution containing sufficient chloroplatinic acid to raise the platinum content to about 0.01 to 1.0 percent by weight, based on $Al_2O_3$, and aluminum chloride in a mole ratio of aluminum chloride to platinum of about 5:1, and thereafter recalcined. The resulting catalyst exhibits very-high activity when employed for upgrading petroleum naphthas under reforming conditions (e.g., 800–1050° F., 1000–1200 p.s.i.g., 0.5 to 5.0 weight-hourly space velocity, and hydrogen recycle ratio of 1000 to 10,000 standard cubic feet per barrel of naphtha).

As hereinabove pointed out, after use of the ion exchange resin for purification of alumina, the resin may be regenerated by techniques known in the art. For example, an anionic exchange resin may be treated with a basic solution which is substantially free of contaminants deleterious to alumina. For such purposes, aqueous ammonium hydroxide solutions have given very satisfactory results at minimum cost. In similar fashion a cationic exchange resin may be regenerated by contacting with any one of a number of acids, said acids also being substantially free of contaminants deleterious to alumina, e.g., hydrochloric acid, nitric acid, perchloric acid, formic acid, and the like, preferably, hydrochloric acid. Mixtures of both anionic and cationic exchange resins may, of course, be regenerated by contact with both a base and an acid. Conditions for regeneration of the resins are known in the art and do not, per se, constitute part of the present invention.

The technique of the present invention, which involves solid-solid contacting of alumina and resin, is to be distinguished from ion exchange of materials in solution. The impurities which are removed by the present invention are impurities which can not be removed by repeated washing of the alumina. To remove such impurities without bringing any substantial portion of the alumina into solution is a problem solved by the method of the present invention.

The following specific examples more clearly illustrate the technique and advantages of the present invention.

*Example 1*

Four 400-gram samples of silica-stabilized alumina produced by the Aluminum Company of America and known as "Alcoa H–51," were each slurried for a period ranging from 0.5 to 24 hours in three liters of distilled water containing 100 grams of a mixture of anionic and cationic exchange resins produced by Rohm & Haas Company and known as "Amberlite MB-3." Particle sizes of the alumina samples were small enough to pass a No. 325 standard sieve, while the resin particle sizes were small enough to pass about a No. 80 standard sieve but too large to pass a No. 200 standard sieve. After slurrying, the alumnia was separated from the resin by screening with a No. 200 standard sieve. Emission spectographic analyses of the alumina gave the following results:

| Element | Contaminant content, weight percent | | | | |
|---|---|---|---|---|---|
| | Untreated | 0.5-hr. treat | 1-hr. treat | 2-hr. treat | 24-hrs. treat |
| S | 0.171 | | 0.148 | 0.078 | |
| Na | 0.24 | 0.07 | | | 0.05 |
| Fe | 0.074 | 0.068 | | | 0.072 |
| Cu | 0.003 | 0.002 | | | 0.002 |
| Mn | 0.008 | 0.006 | | | 0.005 |
| Si | 0.69 | 0.52 | | | 0.57 |

The above data illustrate the excellent contaminant removal characteristic of the present invention, particularly the removal of sulfur by anionic exchange and the removal of sodium by cationic exchange. After calcination the resulting purified alumnia may be used as a catalyst per se or as a catalyst support, e.g., in the form of a platinum-alumina catalyst.

Example II

Samples of another alumina of commercial purity produced by Filtrol Corporation and known as "Filtrol Grade 90" were treated as above described in connection with Example I. Sulfur content of the untreated and treated aluminas were as follows:

```
                    Sulfur content,
                    weight percent
Untreated _____ 0.171
1-hr. treat _____ 0.114
2-hr. treat _____ 0.065
```

These data demonstrate the excellent sulfur removal resulting from anionic exchange.

Example III

A sample of still another commercially-available alumina of commercial purity produced by The Harshaw Chemical Company and known as "Harshaw No. 69" was treated as above described in connection with Example I. The untreated and treated aluminas were analyzed for sodium with the following results:

```
                    Sodium content,
                    weight percent
Untreated _____ 0.21
2.5-hr. treat _____ 0.06
```

These data demonstrate the substantial removal of sodium resulting from cationic exchange.

Example IV

Still another sample of commercially-available alumina of commercial purity produced by The Harshaw Chemical Company and known as "Harshaw No. 5" was treated as above described in connection with Example I. The untreated and treated aluminas were analyzed for calcium with the following results:

```
                    Calcium content,
                    weight percent
Untreated _____ 1.0
2.5-hr. treat _____ 0.32
```

These data clearly demonstrate the substantial removal of calcium by cationic exchange.

Example V

Additional samples of "Alcoa H-51" and "Harshaw No. 69" commercial-grade aluminas were treated in accordance with the present invention as above described in connection with Example I, the treating periods being about 1 hour. The resulting purified aluminas were calcined for 3 hours at 900° F., crushed, lubricated with 4 percent of Sterotex, formed into 1/8" x 1/8" pellets, and recalcined for 6 hours at 1,000° F. The pellets were then impregnated with an aqueous solution of chloroplatinic acid and aluminum chloride to raise the platinum level to about 0.3 percent by weight, based on $Al_2O_3$, the mole ratio of aluminum chloride to platinum being about 5:1, followed by drying for about 16 hours at 250° F. and calcination for about 6 hours at about 1,000° F.

The resulting platinum-alumina catalysts and "blank" samples, which were prepared in exactly the same manner except that they were not slurried with an ion exchange resin in accordance with the present invention, were then tested in a pilot-plant unit for the reforming of a petroleum naphtha. The naphtha employed was of Mid-Continent origin and had the following inspections:

```
ASTM distillation, ° F.:
    IBP _____ 188
    10% _____ 230
    30% _____ 249
    50% _____ 273
    70% _____ 293
    90% _____ 322
    Max. _____ 381
Gravity, ° API _____ 55.3
RVP, lbs _____ 1.4
Sulfur, weight % _____ 0.02
Octane number, CFR-R clear _____ 44.2
Type analysis, vol. %:
    Paraffins _____ 51.0
    Olefins _____ 0.5
    Naphthenes _____ 41.5
    Aromatics _____ 7.0
```

A quasi-isothermal laboratory reactor was employed for the tests, comprising a tubular reaction vessel holding 50 milliliters of catalyst, surrounded by an electrically-heated metal block for temperature control. The block was maintained at a temperature of approximately 935° F., and the hydroforming reaction was carried out at a pressure of 200 pounds per square inch gage, a space velocity of 2, and a once-through hydrogen rate of 5,000 cubic feet per barrel of naphtha feed. The products were collected, and the CFR-R octane numbers of the $C_{5+}$ product fractions after 12 hours on-stream and the octane decline rates were determined with the following results:

| Alumina source | Treated | Results as platinum-alumina reforming catalyst | |
|---|---|---|---|
| | | 12-hr. octane, CFR-R clear | Decline rate, octanes/ 100 hrs. |
| Alcoa H-51 | No | 87.3 | 11.7 |
| Do | Yes | 91.7 | 11.7 |
| Harshaw 69 | No | 73.4 | 15.4 |
| Do | Yes | 92.3 | 6.1 |

These data clearly demonstrate the greatly-improved activity characteristics which result from treating the alumina in accordance with the present invention. The higher activity for the catalysts prepared from the resin-contacted alumina is even more impressive in view of their lower halogen contents (about 15–40 percent less chloride).

Example VI

Since sulfur is known to be, under certain circumstances, a poison for platinum-alumina catalysts and since sulfur can be substantially reduced by hydrogen treating as well as by the method of the present invention, both techniques were compared to ascertain their relative effectiveness. For this purpose, two aliquot samples of "Filtrol Grade 90" alumina were made into platinum-alumina hydroforming catalysts after one was hydrogen treated and the other was treated in accordance with the present invention. Accordingly, the first sample of the alumina was hydrogen treated for 3 hours at 900° F. The second sample was treated in accordance with the present invention as described in Example I, the treating period being about 1 hour. Platinum-alumina catalysts were then prepared from these aluminas and tested as described in Example V. The results are as follows:

| Treatment | Results as platinum-alumina reforming catalyst | |
| --- | --- | --- |
|  | 12-hr. octane, CFR-R clear | Decline rate, octanes/ 100 hrs. |
| Hydrogen | 95.2 | 4.4 |
| Ion exchange resin | 95.8 | 2.6 |

The data clearly demonstrate that the technique of the present invention is superior with respect to activity and very superior with respect to activity decline rate. As in Example V, these results are even more impressive in view of the lower chloride content of the sample contacted with the ion exchange resin (0.63 percent by weight as compared with 0.84 percent by weight).

When the platinum-alumina catalysts of Examples V and VI become contaminated with carbon, sulfur, trace metals, and the like, as the result of reforming operations, the catalysts may be reactivated by burning carbon therefrom (e.g., with flue gas containing 0.2 to 2.0 percent oxygen at about 700 to 1050° F.) and thereafter contacting the carbon-free catalysts with an ion exchange resin under conditions as above described. If the catalysts are already in powdered finely-divided form (e.g., such as would be required in a fluidized catalytic hydroforming process), no further grinding of the catalysts may be necessary to prepare them for slurrying with the ion exchange resin.

While the invention has been described with reference to certain examples and operating embodiments, it is to be understood that such examples and embodiments are illustrative only and not by way of limitation. Numerous additional embodiments of the invention will be apparent from the foregoing description to those skilled in the art.

In accordance with the foregoing description, what is claimed is:

1. A method of purifying a gamma-type alumina containing trace amounts of contaminants which comprises slurrying the alumina in an aqueous medium containing an ion exchange resin for a period in excess of about 0.1 hour, said alumina and said ion exchange resin both being in finely-divided solid form, and thereafter separating said alumina from said resin.

2. The method of claim 1 wherein said ion exchange resin is a cationic exchange resin.

3. The method of claim 1 wherein said ion exchange resin is an anionic exchange resin.

4. The method of claim 1 wherein said ion exchange resin is a mixture of anionic and cationic exchange resins.

5. The method of claim 1 wherein said alumina and said ion exchange resin differ in particle size by at least about two consecutive standard sieves whereby said alumina may be separated from said resin by particle-size classification.

6. The method of claim 1 wherein said alumina and said ion-exchange resin differ in density by at least about 10 percent whereby said alumina may be separated from said resin by density classification.

7. A method of purifying a gamma-type alumina containing trace amounts of contaminants which comprises crushing said alumina to a particle size small enough to pass a No. 10 standard sieve, slurrying the crushed alumina in an aqueous medium containing an ion exchange resin for a period in excess of about 0.1 hour, said ion exchange resin also having a particle size small enough to pass a No. 10 standard sieve but differing in particle size from said alumina by at least about two consecutive standard sieves, and thereafter separating said alumina from said resin by particle size classification.

8. A method of preparing a platinum-alumina catalyst of improved activity characteristics from a gamma-type alumina containing trace amounts of contaminants which comprises slurrying the alumina in an aqueous medium containing an ion exchange resin for a period in excess of 0.1 hour, said alumina and said ion exchange resin both being in finely-divided solid form but differing from each other in particle size sufficiently to permit separation by particle size classification, thereafter separating said alumina from said resin by particle size classification, incorporating into said separated alumina about 0.01 to 2 percent by weight, based on $Al_2O_3$, of platinum.

9. The method of claim 8 wherein said ion exchange resin is a mixture of anionic and cationic exchange resins.

10. A method of preparing a platinum-alumina catalyst of improved activity from a gamma-type alumina containing trace amounts of impurities which comprises slurrying said alumina in an aqueous medium containing a mixture of anionic and cationic exchange resins for a period in excess of 0.1 hour, said alumina and said mixture both being in finely-divided solid form but differing from each other in particle size sufficiently to permit separation by screening, thereafter separating said alumina from said mixture by screening, incorporating into said alumina about 0.01 to 2 percent by weight, based on $Al_2O_3$, of platinum, and thereafter calcining the resulting platinum-containing alumina.

11. A method of preparing an inexpensive platinum-alumina composite of improved catalytic properties for reforming which comprises slurrying a gamma-type alumina containing trace amounts of impurities in an aqueous medium containing a mixture of anionic and cationic exchange resins for a period in excess of about 0.1 hour, said alumina being in solid particulate form small enough to pass a No. 200 standard sieve and said mixture having particle sizes small enough to pass a No. 10 standard sieve but too large to pass a No. 200 standard sieve, thereafter separating said alumina from said mixture by screening with a No. 200 standard sieve, calcining the separated alumina, and incorporating about 0.01 to 2 percent by weight, based on $Al_2O_3$, of platinum into the calcined alumina.

12. The method of claim 11 wherein the weight ratio of said alumina and said mixture is less than about 10:1.

13. A method of purifying a platinum-alumina composite which has become contaminated with excessive impurities, including carbon, sulfur, and trace metals, as the result of use for the conversion of hydrocarbons, which comprises burning carbon from said composite, slurrying said composite in water containing a mixture of anionic and cationic exchange resins for a period in excess of 0.1 hour, said composite and said mixture both being in finely-divided form but differing from each other in particle size sufficiently to permit separation by screening, thereafter separating said composite from said mixture by screening, and thereafter calcining the resulting purified composite.

14. A process for reforming petroleum naphthas which comprises contacting a petroleum naphtha under reforming conditions with a platinum-alumina composite prepared from a gamma-type alumina containing trace amounts of impurities by the method which comprises slurrying said alumina in an aqueous medium containing an ion exchange resin selected from the class consisting of anionic exchange resins, cationic exchange resins and mixtures thereof for a period in excess of 0.1 hour, said alumina and said ion exchange resin both being in finely-divided solid form, separating said alumina from said resin, incorporating into said separated alumina between about 0.01 to 2 percent by weight, based on $Al_2O_3$, of platinum, and thereafter calcining the resulting platinum-containing alumina.

15. The method of claim 14 in which said alumina and said ion exchange resin differ in particle size by at least two consecutive standard sieves, whereby said alumina may be separated from said resin by particle size classification.

16. A process of reforming petroleum naphthas which comprises contacting a petroleum naphtha under reforming conditions with a platinum-alumina composite which, after having become contaminated with carbon and trace amounts of contaminants as a result of use in a reforming process, has been reactivated by a process which comprises burning carbon from said composite, slurrying said composite in an aqueous medium containing an ion exchange resin selected from the class consisting of anionic exchange resins, cationic exchange resins and mixtures thereof for a period in excess of 0.1 hour, said composite and said ion exchange resin both being in finely-divided form, separating said composite from said resin, and calcining the resulting purified composite.

17. The method of claim 16 in which said alumina and said ion exchange resin differ in particle size by at least two consecutive standard sieves, whereby said alumina may be separated from said resin by particle size classification.

References Cited in the file of this patent

UNITED STATES PATENTS

| | | |
|---|---|---|
| 2,326,323 | Benedict | Aug. 10, 1943 |
| 2,658,028 | Haensel et al. | Nov. 3, 1953 |
| 2,733,205 | Dalton | Jan. 31, 1956 |
| 2,866,748 | Feller | Dec. 30, 1958 |